No. 615,013. Patented Nov. 29, 1898.
G. J. CAPEWELL.
KNIFE SHARPENER.
(Application filed Aug. 8, 1898.)
(No Model.)
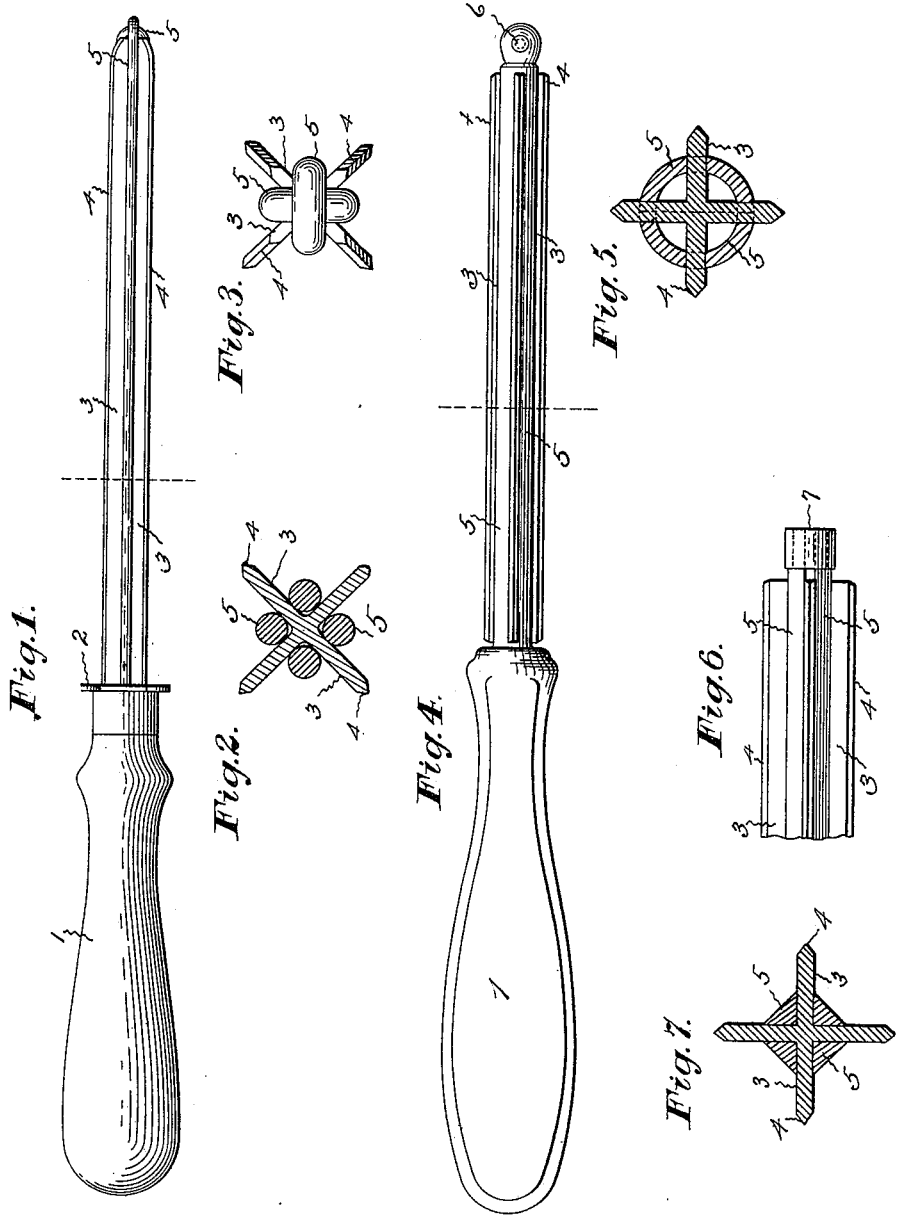
Witnesses:
Chas. D. King.
E. J. Hyde.
Inventor:
George J. Capewell,
by Harry R. Williams,
Atty.
THE NORRIS PETERS CO., PHOTO-LITHO., WASHINGTON, D. C.

UNITED STATES PATENT OFFICE.

GEORGE J. CAPEWELL, OF HARTFORD, CONNECTICUT, ASSIGNOR TO THE AMERICAN SPECIALTY MANUFACTURING COMPANY, OF SAME PLACE.

KNIFE-SHARPENER.

SPECIFICATION forming part of Letters Patent No. 615,013, dated November 29, 1898.

Application filed August 8, 1898. Serial No. 688,013. (No model.)

*To all whom it may concern:*

Be it known that I, GEORGE J. CAPEWELL, a citizen of the United States, residing at Hartford, in the county of Hartford and State of Connecticut, have invented certain new and useful Improvements in Knife-Sharpeners, of which the following is a specification.

This invention relates to a sharpener that is more particularly designed and intended for putting an edge upon carving, bread, and case knives and the like household cutlery.

The object of the invention is the production of a very simple sharpener which can be cheaply manufactured of such materials as to possess the highest sharpening efficiency and the greatest durability possible.

The sharpeners shown in the accompanying drawings as embodying the invention have handles, a number of projecting blades with cutting edges formed of exceedingly hard metal, and a number of reinforcing-strips of tougher and less brittle metal than the blades for strengthening and protecting the blades and securing them to the handles.

Of the accompanying drawings, Figure 1 is a view of one form of sharpener that embodies the invention. Fig. 2 is an enlarged cross-section taken on the plane indicated by the dotted line of Fig. 1. Fig. 3 is an enlarged end view of this form of sharpener. Fig. 4 is a view of another form of sharpener. Fig. 5 is an enlarged section of this latter form. Fig. 6 is a view of a portion of the end of another form of sharpener, showing a modified arrangement of securing the ends of the reinforcing-strips; and Fig. 7 is an enlarged transverse section showing still another form of reinforcing-strips.

The handle 1 of the sharpener may be formed of wood or of metal in any desired outline and may or may not be provided with a guard 2.

The sharpening-blades 3, which have ground cutting edges 4, along which the knife to be put into condition is drawn, are cast of steel integral with each other, so as to form a body that is X-shaped in cross-section. These blades are made of such steel and are subjected to such treatment that they are exceedingly hard, and consequently quite brittle.

Secured to the handle and extending in the angular openings between the blades are reinforcing-strips 5. These strips may be formed of tough round wire, as shown in Figs. 1 to 3. The strips shown in these figures are bent to U shape, and the bent portions extend around the outer end of the blade-body, while the ends pass into and are connected in any suitable manner to the handle. The reinforcing-strips may, if desired, be formed integral with the handle, as are those illustrated in Figs. 4 and 5. These strips are provided with an opening for the blade-body, and after the parts are put together the outer ends of the strips may be secured by a rivet 6. The reinforcing-strips when formed of wire may, instead of being bent to form loops, be fastened at their inner ends to the handle and have their outer ends secured by a ferrule 7, as illustrated in Fig. 6. The cross-sectional shape of the reinforcing-strips is immaterial. They may be circular, segmental, or triangular, as illustrated, and they may be attached to the handle in any convenient manner.

The handle of this sharpener, which may be turned from wood or may be stamped or cast from metal, is simple to form, and the blades, which are of exceedingly hard, and consequently brittle, steel, are securely attached to the handle by the strips, which, being of softer metal than the blades, so reinforce and strengthen the blades as to prevent them from becoming broken during use or if accidentally dropped.

One side of the knife-blade to be sharpened is drawn across the ground cutting edge of the upper sharpening-blade, and then the other side of the knife-blade is drawn across the ground cutting edge of the lower sharpening edge. This is repeated until the knife-blade is reduced to the desired condition for satisfactory cutting.

This sharpener is efficient, for the sharpening-blades can be made very hard, and is durable on account of the hardness of the blades and the manner in which they are prevented from becoming broken, and the construction is simple and cheap.

I claim as my invention—

1. A knife-sharpener consisting of a handle, a number of integral blades with cutting edges of very hard metal, and reinforcing-strips of softer material than the blades lying in the openings between the blades, substantially as specified.

2. A knife-sharpener consisting of a handle, an X-shaped blade-body with sharp cutting edges of very hard metal, and reinforcing-strips of softer material than the blade-body lying in the angular openings between the blades and secured to the handle, substantially as specified.

GEORGE J. CAPEWELL.

Witnesses:
HARRY R. WILLIAMS,
E. J. HYDE.